(12) United States Patent
Steinhauer

(10) Patent No.: US 8,399,036 B2
(45) Date of Patent: Mar. 19, 2013

(54) LAYERED TACO MAKER AND METHOD

(76) Inventor: G. Alan Steinhauer, Raleigh, NC (US)

( * ) Notice: Subject to any disclaimer, the term of this patent is extended or adjusted under 35 U.S.C. 154(b) by 1811 days.

(21) Appl. No.: 10/844,369

(22) Filed: May 13, 2004

(65) Prior Publication Data

US 2005/0255195 A1 Nov. 17, 2005

(51) Int. Cl.
*A47J 43/28* (2006.01)
(52) U.S. Cl. ........................ 426/389; 426/394
(58) Field of Classification Search ............... 426/92, 426/94, 283, 120, 119, 124, 115, 389
See application file for complete search history.

(56) References Cited

U.S. PATENT DOCUMENTS

| | | | | |
|---|---|---|---|---|
| 1,807,189 A | * | 5/1931 | Bemis | 426/92 |
| 2,741,901 A | * | 4/1956 | Silos | 211/85.4 |
| 3,817,163 A | * | 6/1974 | Kizziar et al. | 99/353 |
| 3,909,881 A | * | 10/1975 | Anderson | 425/116 |
| 4,004,501 A | * | 1/1977 | Guerrero | 99/426 |
| D282,338 S | * | 1/1986 | Putt | D7/504 |
| 4,573,570 A | | 3/1986 | Cortopassi | |
| D288,273 S | * | 2/1987 | Gould | D7/586 |
| 4,729,589 A | * | 3/1988 | Puskar | 294/26.5 |
| 5,005,704 A | | 4/1991 | Martin | |
| 5,012,971 A | * | 5/1991 | Cozzi et al. | 229/120.07 |
| 5,065,870 A | | 11/1991 | Conder, Jr. | |
| 5,937,743 A | * | 8/1999 | Overstreet | 99/426 |
| 6,224,928 B1 | * | 5/2001 | Jacobbi | 426/275 |
| 6,273,278 B1 | | 8/2001 | Enyedy et al. | |
| 6,582,741 B2 | * | 6/2003 | Haig | 426/281 |
| 6,602,528 B1 | * | 8/2003 | Wells | 426/120 |
| 7,011,859 B2 | * | 3/2006 | Holbrook | 426/282 |
| 2002/0178977 A1 | * | 12/2002 | Poarch et al. | 108/115 |

* cited by examiner

*Primary Examiner* — Steven Leff
(74) *Attorney, Agent, or Firm* — Welsh Flaxman & Gitler LLC

(57) ABSTRACT

A method for filling an edible shell, in particular, a taco shell is achieved by gathering a first filling ingredient for a taco and layering the first filling ingredient along a first plane, gathering a second filling ingredient for a taco and layering the second filling ingredient along a second plane substantially parallel to the first plane, and inserting the layered first and second filling ingredients within a taco shell. A template for the preparation of a layered taco is also provided. The template includes a guide member having a concave recess shaped and dimensioned for receiving the open end of a taco shell, the concave recess being defined by a facing wall in the generally shape of the open end of the taco shell. The template also includes a support shelf transversely positioned within the concave recess. At least one filling ingredient is placed upon the support shelf, the taco shell is slid within the concave section with the filling ingredient between the first and second shell walls and the support shelf is withdrawn such that the filling ingredient is released to lie within the taco shell.

7 Claims, 2 Drawing Sheets

LAYERED TACO MAKER AND METHOD

BACKGROUND OF THE INVENTION

1. Field of the Invention

The invention relates to a method and apparatus for making tacos and other filled edible shells. In particular, the invention relates to a method and apparatus for making layered tacos such that filling ingredients are layered across the taco shell allowing an individual to taste all the ingredients as he or she bites transversely through the taco.

2. Description of the Prior Art

Traditional tacos are manufactured by placing one ingredient on top of other ingredients within a taco shell, such that they are stacked horizontally (see FIG. 1). As such, the ingredients extend from the closed end of the taco shell to the open end of the taco shell with one ingredient being at the bottom closest to the closed end of the taco shell and other ingredients successively being positioned closer to the open end of the taco shell. This arrangement does not allow for bites that evenly cover all of the flavors found within the taco as people generally do not bite from the closed or open end, but rather bite transversely across the taco shell. Any attempt to cover all of the ingredients in your mouth at one time requires taking at least two bites. This is difficult, unmannerly and results in too much food in the mouth of the average person.

As such, a need exists for a method and apparatus for the manufacture of tacos such that individuals eating the tacos evenly cover all the flavors of the taco in a single bite. The present invention provides such a method and apparatus.

SUMMARY OF THE INVENTION

It is, therefore, an object of the present invention to provide a method for filling an edible shell using a template for supporting filling ingredients prior to placement within an edible shell. The template includes a guide member having a concave recess shaped and dimensioned for receiving an open end of the edible shell and a support shelf transversely positioned within the concave recess. The method comprises the steps of gathering a first filling ingredient for the edible shell and layering the first filling ingredient along the support shelf in a first plane, gathering a second filling ingredient for the edible shell and layering the second filling ingredient on top of the first filling ingredient along a second plane substantially parallel to the first plane, and inserting the layered first and second filling ingredients within the edible shell.

It is also an object of the present invention to provide a template for the preparation of a layered edible shell. The edible shell includes at least one filling ingredient positioned within the edible shell. The edible shell has a first shell wall linked to a second shell wall such that the first and second shell walls are oriented in a facing relationship with an open end and a closed end. The template includes a guide member having a concave recess shaped and dimensioned for receiving the open end of the edible shell. The concave recess is defined by a facing wall in the general shape of the open end of the edible shell. The template also includes a support shelf transversely positioned within the concave recess. In use, at least one filling ingredient is placed upon the support shelf, the edible shell is slid within the concave section with the filling ingredient between the first and second shell walls and the support shelf is withdrawn such that the filling ingredient is released to lie within the edible shell.

It is another object of the present invention to provide a taco prepared in accordance with the method described above.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

Figure 1:
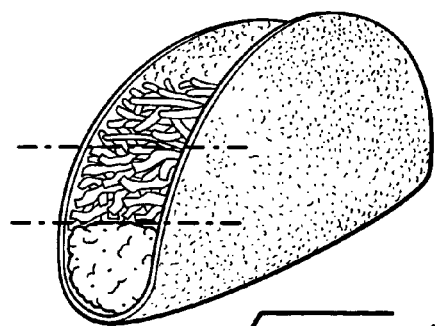
FIG. 1 is a perspective view of a prior art taco with the ingredients piled within the taco shell transversely relative to the shell walls.
Figure 3A:
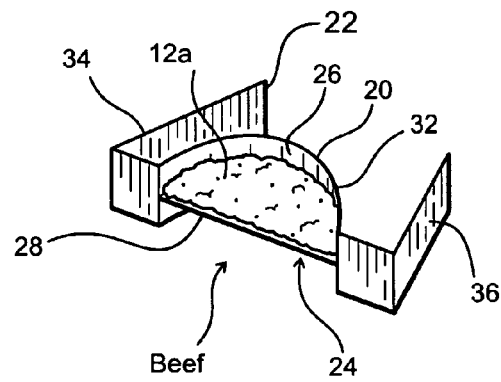
FIGS. 3a-e show the steps associated with the manufacture of a taco in accordance with the present invention.
Figure 3B:
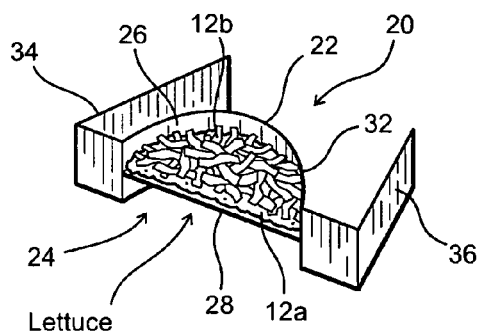
Figure 3C:
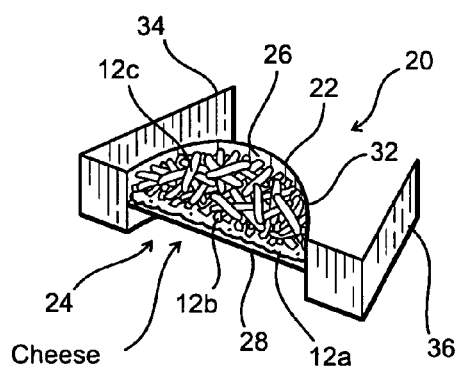
Figure 3D:
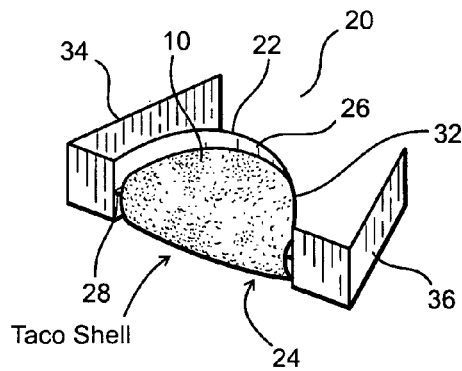
Figure 3E:
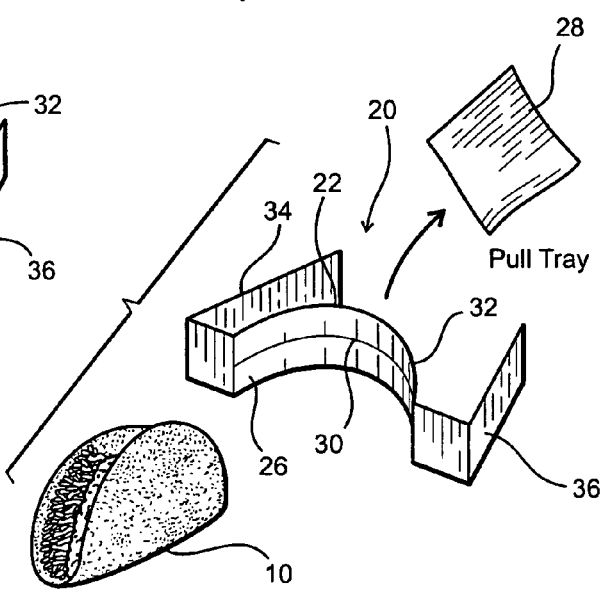

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIGS. 2 and 3a-e, a method and apparatus for filling a taco shell 10, or other edible shell, is disclosed. Generally, the method and apparatus allow for the layered filing of a taco shell 10 such that each time an individual bites across the taco shell he or she tastes all the flavors of the fillings 12a-c used within the taco shell.

In accordance with a preferred embodiment of the present invention, the present method is achieved by gathering a first filling ingredient 12a for a taco and layering the first filling ingredient 12a along a first horizontal plane. Thereafter, a second filling ingredient 12b is gathered and layered upon the first filling ingredient 12a. The second filling ingredient 12b is layered along a second plane that is substantially parallel to the first plane. The process can be repeated depending upon the number of layered ingredients desired. The layered first and second ingredients 12a, 12b are then inserted within a taco shell 10 lying in a horizontal plane such that the first and second filling ingredients 12a, 12b run substantially parallel to the first shell wall 14 and the second shell wall 16 of the taco shell 10.

More particularly, the taco shell 10 includes a first shell wall 14 linked to a second shell wall 16 such that the first and second shell walls 14, 16 are oriented in a facing relationship. In fact, and as those skilled in the art will appreciate, the first and second shell walls 14, 16 are oriented in a substantially parallel relationship. As such, when the first filling ingredient 12a and the second filling ingredient 12b are layered in a parallel relationship and then inserted within the taco shell 10, the first shell wall 14 and the second shell wall 16 are oriented substantially parallel to the first plane and the second plane in which the first filling ingredient 12a and the second filling ingredient 12b respectively lie. In accordance with a preferred embodiment, the filling ingredients 12a-12c are selected from the group consisting of meat, lettuce, tomatoes, beans, cheese, sour cream, green onions, taco sauce and salsa. However, those skilled in the art will appreciate that a variety of filling materials not listed above may also be used at the discretion of the taco maker or eater. These filling ingredients may be gathered, layered and inserted within the taco shell in any desired order and in any desired combination so long as the filling ingredients do not exceed the space provided within the taco shell 10.

In accordance with a preferred embodiment, a user might first create a layer of beef upon which is positioned a layer of lettuce and a layer of cheese. Thereafter, the taco shell is positioned around the layered ingredients and placed therein.

Layering and positioning of the various filling ingredients 12*a-c* is achieved through the utilization of a template 20 as shown with reference to FIG. 3*a-e*. The template 20 is particularly designed for the preparation of a layered taco, wherein the taco includes a taco shell 10 with at least one filling ingredient 12*a-c* positioned between the first and second shell walls 14, 16. Taco shells 10 utilized in accordance with the present inventions will have a first shell wall 14 linked to a second shell wall 16 such that the first and second shell walls 14, 16 are oriented in a facing relationship with an open end 18 and a closed end 19.

The template 20 includes a guide member 22 having a concave recess 24 shaped and dimensioned for receiving the open end 18 of the taco shell 10. The concave recess 24 is defined by a facing wall 26 in the general shape of the open end 18 of the taco shell 10. The template 20 further includes a support shelf 28 transversely positioned within the concave recess. The support shelf 28 is supported within a slit 30 formed in the facing wall 26 of the concave recess 24. The guide member 22 includes an outer wall 32 opposed to the facing wall 26 and the slit 30 extends between the facing wall 26 and the outer wall 32 such that the support shelf 28 may be selectively drawn from its positioned within the concave recess 24.

In addition to the concave recess 24, the guide member 22 includes first and second outwardly extending arms 34, 36 extending from respective opposite ends of the concave recess 24 for supporting the template 20 upon a support surface. In addition, the support shelf 28 is oriented substantially perpendicular to the facing wall.

In accordance with a preferred embodiment, the template 20 is made out of cardboard, allowing it to be disposable. However, multi-use templates may be manufactured from plastic or other durable materials. As those skilled in the art will certainly appreciate, a variety of materials may be utilized in the construction of the template without departing from the spirit of the present invention.

Figure 2:
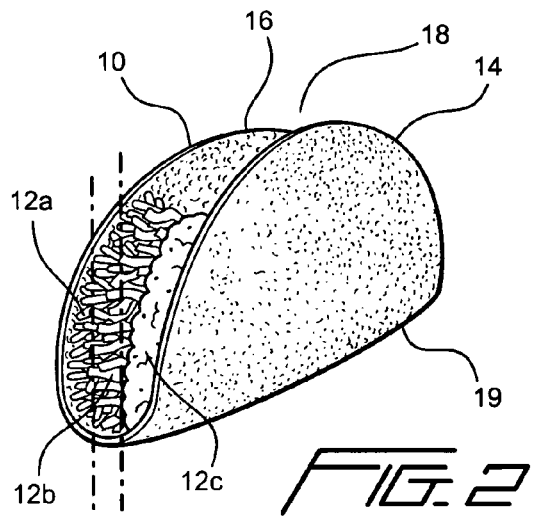
FIG. 2 is a perspective view of a taco in accordance with the present invention.

In use, the filling ingredients 12*a-c* are layered upon the support shelf 28 that is transversely positioned within the concave recess 24. For example, beef may be layered directly upon the support shelf 28 (see FIG. 3*a*) and lettuce (see FIG. 3*b*) layered there upon, and cheese layered there upon (see FIG. 3*c*). Thereafter, the taco shell 10 is inserted within the concave recess 24 such that the filling ingredients 12*a-c* are positioned between the first and second shell walls 14, 16 with the closed end 19 of the taco shell 10 extending away from the facing wall 26 of the support shelf 28 (see FIG. 3*d*). Once the taco shell is inserted, the support shelf 28 is pulled through the slit 30 toward the outer wall 32, thereby removing it from the concave recess 24 and allowing the filling ingredients 12*a-c* to fall within the taco shell 10. The taco shell 10 may then be removed from the concave recess 24 and the taco is ready for eating (see FIG. 3*e*). As seen in FIG. 2 the ingredients are layered one next to the other in vertical planes.

In accordance with a further embodiment of the present invention, and with reference to FIG. 4*a-e*, a template 120 is provided which does not include a removable support shelf. Rather, the support shelf 128 is permanently positioned within the concave recess 124.

When this alternate embodiment of the template 120 is used, the filling ingredients 12*a-c* are layered upon the support shelf 128 in much the same manner as described above with reference to FIGS. 3*a-e*. However, the filling ingredients should be layered upon the support shelf 128 such that a filling ingredient that will easily slide off the support shelf 128 is first placed upon the support shelf 128. As will be better appreciate from the following disclosure, this layering preference permits the filling ingredients to slide from the support shelf 128 upon withdrawal of the filled taco. With this in mind, the template 120, and particularly the support shelf 128, may be manufactured from low friction materials, for example, nonstick coated materials, plastics, etc.

Figure 4A:
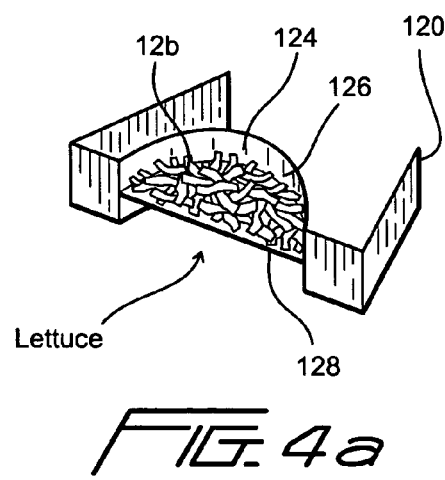
FIGS. 4a-e show the steps associated with the manufacture of a taco in accordance with an alternate embodiment of the present invention.
Figure 4B:
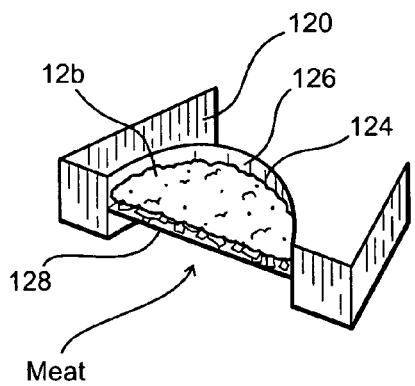
Figure 4C:
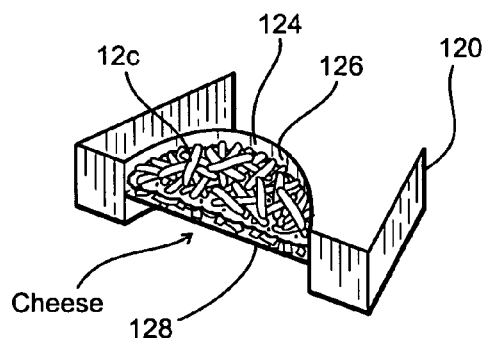
Figure 4D:
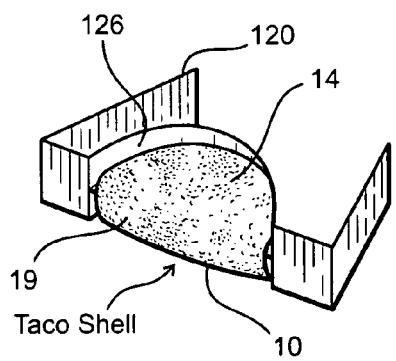
Figure 4E:
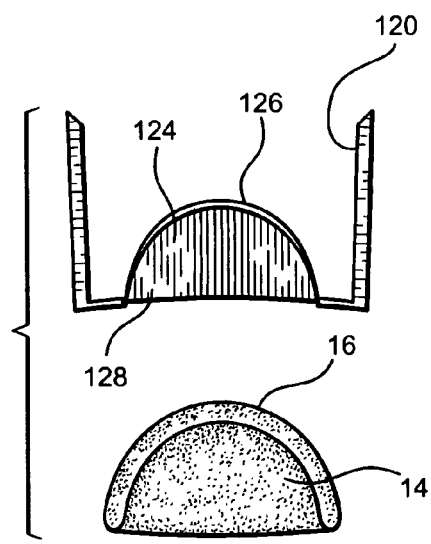

For example, lettuce may first be layered directly upon the support shelf 128 (see FIG. 4*a*) and meat layered there upon (see FIG. 4*b*), and cheese layered there upon (see FIG. 4*c*). Thereafter, the taco shell 10 is inserted within the concave recess 124 such that the first and second shell walls 14, 16 are oriented substantially horizontal and the filling ingredients 12*a-c* are positioned between the first and second shell walls 14, 16 with the closed end 19 of the taco shell 10 extending away from the facing wall 126 of the support shelf 128 (see FIG. 4*d*). Once the taco shell is inserted, the taco 10 and template 120 are rotated approximately 90 degrees such that the support shelf 128 and the first and second shell walls 14, 16 are oriented substantially vertical. At this time the taco shell 10 is withdrawn from the concave recess 124, either by moving the taco shell 10 or the template 120, thereby allowing the filling ingredients 12*a-c* to fall within the taco shell 10 (see FIG. 4*e*). When the taco shell 10 is removed from the concave recess 124, the taco is ready for eating with the filling ingredients 12*a-c* layered one on top the other substantially parallel to the first and second shell walls 14, 16.

Although the present invention has been described with reference to making tacos with hard taco shells, the concepts underlying the present invention may be applied to a variety of food manufacturing processes employing shells without departing from the spirit of the present invention.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A method for filling an edible shell using a template for supporting filling ingredients prior to placement within the edible shell, the template includes a recess shaped and dimensioned for receiving an open end of the edible shell and the template also includes a support shelf transversely positioned within the recess, the method comprising the following steps:
    gathering a first filling ingredient for the edible shell and layering the first filling ingredient along the support shelf in a first horizontal plane;
    gathering a second filling ingredient for the edible shell and layering the second filling ingredient on top of the first filling ingredient along a second horizontal plane; and
    inserting the layered first and second filling ingredients within the edible shell;
    removing the support shelf from the template and edible shell allowing the first filling ingredient and the second filling ingredient to fall within the edible shell.

2. The method according to claim 1, wherein the edible shell includes a first shell wall linked to a second shell wall such that the first and second shell walls are oriented in a facing relationship.

3. The method according to claim 2, wherein the first shell wall and the second shell wall are substantially parallel.

4. The method according to claim 3, wherein the first and second planes are substantially parallel to the first shell wall and the second shell wall.

5. The method according to claim 1, wherein the first and second filling ingredients are selected from the group consisting of meat, lettuce, tomatoes, beans, cheese, green onions, taco sauce and salsa.

6. The method according to claim 5, further including the step of gathering a third filling ingredient for the edible shell and layering the third filling ingredient along a third plane substantially parallel to the first plane.

7. The method according to claim 1, further including the step of gathering a third filling ingredient for the edible shell and layering the third filling ingredient along a third plane substantially parallel to the first plane.

* * * * *